Aug. 23, 1932.  L. A. DUNCKLEE  1,872,702
RANGE BOILER COUPLING
Filed April 16, 1930
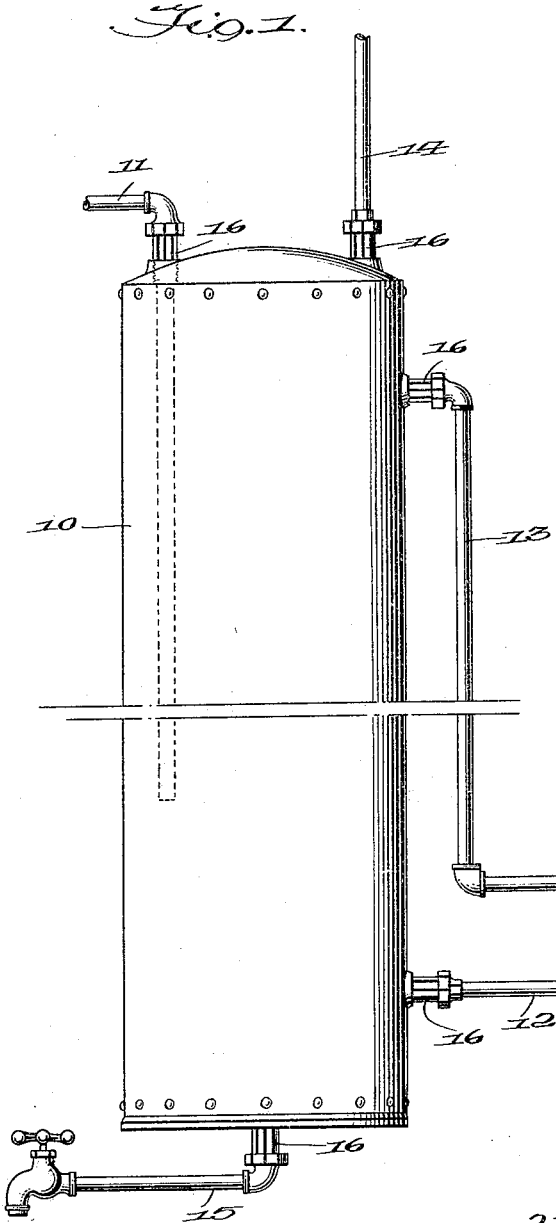
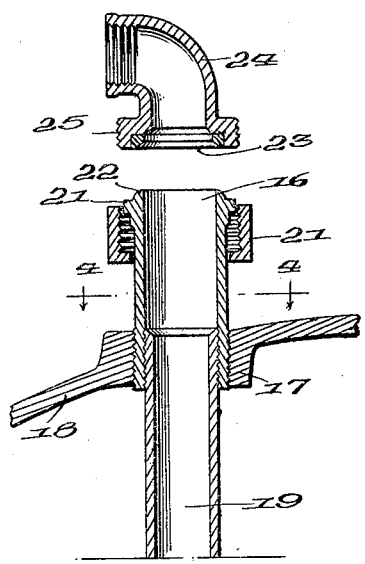
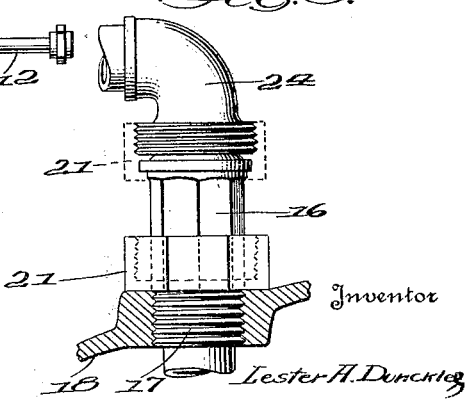

Patented Aug. 23, 1932

1,872,702

UNITED STATES PATENT OFFICE

LESTER A. DUNCKLEE, OF LOCKPORT, NEW YORK, ASSIGNOR TO JEFFERSON UNION COMPANY, OF LEXINGTON, MASSACHUSETTS, A CORPORATION OF MASSACHUSETTS

RANGE BOILER COUPLING

Application filed April 16, 1930. Serial No. 444,801.

The present invention relates to couplings, and has for its object to provide a coupling for range boilers and the like. which may be readily installed by the use of ordinary wrenches, such as, for example, the sliding-jaw type; the construction and disposition of the coupling spud and its associated coupling nut or sleeve being such that the connection may be readily set up or taken down in restricted working spaces, such as are usually found in connection with installations of this character.

To accomplish this result, a coupling is provided made up of a spud member adapted to be engaged with the wall or web of the boiler or other part with which it may be used, which spud member has an extended wrench surface which may be engaged by a wrench or tool at different points over substantially its entire area by reason of its extended wrench-receiving formation, and, combined with such spud member and in sliding relation thereto, is a coupling nut or sleeve of such dimensions as to provide for making a proper connection with the pipe line, and so proportioned relative to the spud member than in any usual position of the coupling nut or sleeve on the spud, an ample wrench-receiving spud area will be exposed to permit wrench manipulation of the spud.

In order that the invention may be clear to those skilled in the art, it is shown in the accompanying drawing, and, for the purposes of this disclosure, is illustrated as applied to the usual range boiler, it being shown applied at various points in order to illustrate the adaptability of it for use in confined spaces.

In the drawing, in which the same reference numerals refer to the same parts in the different views:

Figure 1 is a view in side elevation of a range boiler having the usual pipe lines.

Figure 2 is a view in section of a portion of a boiler or other wall with my improved connection mounted therein.

Figure 3 is a view in side elevation of the connection, the coupling nut or sleeve being shown in its two extreme positions on the spud.

Figure 4 is a cross sectional view on substantially the line 4—4 of Figure 2, looking in the direction of the arrows, to show the cross-sectional contour of the spud member.

Referring to the drawing by numerals, 10 indicates a range boiler of any suitable or desired construction and configuration, in connection with which the invention is shown for the purpose of illustration.

It is provided, as is usual, with the inlet pipe 11, the water-back feed and return pipes 12 and 13, a hot water pipe 14, and the drain or waste pipe 15.

Range boilers of this character, and other containers, are frequently closely set with respect to the walls, floor, and sometimes ceilings, of the rooms in which they are placed, and the connections for the several pipes must, therefore, be set up, taken down, or adjusted, in a restricted working space, so that special tools are frequently required, and it is a matter of some difficulty to properly install and couple the pipe lines and pipe line connections.

In order to provide a connection which is very completely and readily accessible for the use of the ordinary wrenches, I provide a coupling spud 16 threaded at 17 for engagement with the threaded opening in the web 18 of the range boiler or other container, there being provided in the form here shown the usual down pipe 19, threaded interiorly of the spud 16. At its opposite end the spud 16 is provided with a flange 20 adapted to be engaged by the flanged sleeve or coupling nut 21, and the spud has also the usual ground joint 22 to engage the metallic seat 23 of the pipe, or pipe fitting 24, as shown in Figure 2, and form a tight joint when the coupling nut or sleeve 21 is engaged with the fitting 25 of the pipe, or pipe fitting 24, as shown in Figures 2 and 3.

The spud 16 is provided throughout its length, from the threaded portion 17 at one end to the flange 20 at the other end, with flat wrench-receiving surfaces so that it is of the polygonal formation in cross-section as shown in Figure 4, its body presenting a convenient wrench-receiving area and an area of such length that whether the coupling nut or sleeve 21 be in its upper position, as shown in Figures 2 and 3, and coupled with the pipe or pipe fitting 24, or in its lowermost position, as shown in full lines in Figure 3, there will be exposed always on one or the other side of the coupling nut or sleeve 21 an extended and sufficient area of the coupling spud 16 to permit the application thereto of a wrench, and turning of the spud. This is accomplished by providing the extended wrench-receiving surface on the spud and so proportioning the spud and coupling nut or sleeve, that in either of the extreme positions of the nut the exposed wrench engageable surface of the spud will be entirely adequate to receive the wrench.

By this connection ample room to engage the spud with the ordinary sliding-jaw or other wrench is provided, and even though the working space be restricted, the readily engageable spud insures ease of installation, adjustment, or taking down of the parts.

I claim:

A coupling for range boilers having in combination a spud having one end threaded and the other end flanged, and an intermediate relatively long body portion of polygonal form in cross section throughout its length to provide an extended wrench engaging area, and a coupling nut slidably mounted on the polygonal portion of said spud, and of such length as to leave exposed when in both of its extreme end positions on said spud, an extended wrench engaging area of the polygonal body portion of the spud, of greater width than the width of the coupling nut, whereby to permit the application of a wrench to the polygonal body portion for turning the spud when the latter is to be installed in a restricted working space.

In testimony whereof I have hereunto set my hand.

LESTER A. DUNCKLEE.